(12) United States Patent
Granville et al.

(10) Patent No.: US 7,619,881 B1
(45) Date of Patent: Nov. 17, 2009

(54) DISPLAY COMPONENT MODULES

(75) Inventors: Aisha V. Granville, New York, NY (US); Carlton L. Chiles, Tampa, FL (US)

(73) Assignee: Lockheed Martin Corporation, Bethesda, MD (US)

(*) Notice: Subject to any disclaimer, the term of this patent is extended or adjusted under 35 U.S.C. 154(b) by 321 days.

(21) Appl. No.: 11/652,454

(22) Filed: Jan. 11, 2007

(51) Int. Cl.
H05K 5/00 (2006.01)
(52) U.S. Cl. ............ 361/679.21; 361/679.22; 361/679.26
(58) Field of Classification Search .......... 361/681, 361/679.21, 679.22, 679.26
See application file for complete search history.

(56) References Cited

U.S. PATENT DOCUMENTS

| 5,606,438 | A * | 2/1997 | Margalit et al. ........... 349/60 |
| 6,108,199 | A | 8/2000 | Bonardi et al. |
| 6,359,775 | B1 | 3/2002 | Revis |
| 6,560,093 | B1 | 5/2003 | McLeod et al. |
| 6,563,705 | B1 | 5/2003 | Kuo |
| 6,680,843 | B2 | 1/2004 | Farrow et al. |
| 6,697,250 | B2 | 2/2004 | Kuo |
| 6,816,361 | B2 | 11/2004 | Kuo |
| 6,937,258 | B2 | 8/2005 | Lim et al. |
| 7,436,674 | B2 * | 10/2008 | Barsun et al. ........... 361/727 |
| 2004/0090567 | A1 * | 5/2004 | Lee et al. ............... 349/58 |
| 2005/0280981 | A1 | 12/2005 | Chen |
| 2006/0164325 | A1 | 7/2006 | Ford et al. |
| 2006/0193120 | A1 * | 8/2006 | Huang ................. 362/33 |
| 2006/0208670 | A1 * | 9/2006 | Chang et al. ........... 315/360 |
| 2006/0227258 | A1 * | 10/2006 | Lee ..................... 349/58 |
| 2007/0153454 | A1 * | 7/2007 | Chang et al. ........... 361/681 |

* cited by examiner

*Primary Examiner*—Jayprakash N Gandhi
*Assistant Examiner*—Anthony M Haughton
(74) *Attorney, Agent, or Firm*—Brooks, Cameron & Huebsch, PLLC

(57) ABSTRACT

A display device embodiment can include a first module having an inverter component, a second module having a backlight component, a third module having a power supply, and where at least two of the first module, second module, and third module are replaceably connected together.

25 Claims, 4 Drawing Sheets

DISPLAY COMPONENT MODULES

FIELD OF THE DISCLOSURE

The present disclosure relates to display components. In particular, the present disclosure relates to component modules for displays.

BACKGROUND

Image display devices, such as a liquid crystal display (LCD) device, and the like, can be used in many fields of technology. In some fields, these devices can fail due to exposure to the environment and/or their pattern of use.

For example, in some applications, a display may be on continuously for weeks, months, or years. This demand may cause the components of the display to fail.

As another example, in some fields of use, the display may be used under difficult conditions, such as exposure to vibration or exposure to the elements (e.g., heat, water, wind, dirt), or exposure to chemicals or other agents. These environments may cause certain components to fail in such displays.

Additionally, in such fields of use, a display may be "ruggedized" which means many of the components of the display can last longer in these more extreme environments. Accordingly, these ruggedized displays are more expensive to manufacture and take more time to manufacture because the components are designed specially for such rugged environments and therefore may use more materials or take more time to manufacture.

Displays are often produced with the various components fixed together with solder or other permanent fixing mechanisms. Accordingly, when one component of the display fails, the entire display may have to be removed from the field for repair or replacement. In some applications, such as a ship at sea, the prospect of removing the display for repair or replacement can be an inconvenience.

Further, when one component of a display fails, it can be difficult to identify which of the many components has failed. This can be exacerbated by the components being fixed together because it can make testing of and/or access to individual components difficult.

In such display devices, it may be that a large amount of testing has to be performed in order to identify a failed component. In some such display devices, non-failed components may have to be removed or disassembled in order to test and/or replace a failed component.

SUMMARY

The present disclosure includes a number of system, device, and method embodiments. For example, the present disclosure includes a number of device embodiments. For instance, in some display device embodiments, the device can include a first module having an inverter component, a second module having a backlight component, and a third module having a power supply.

These modules each contain a component that is, in many systems, prone to failure (e.g., inverter component, backlight component, power supply). Accordingly, since the components have been separated into multiple modules, it is possible to remove and replace one module rather than sending the entire device in for repair.

In some embodiments, such as the example described above, at least two of the first module, second module, and third module are replaceably connected together (e.g., the first module and the second module, the first and the third module, or the second and the third module). These replaceable connections can be electrical connections, physical connections, or both, in various embodiments. Such embodiments allow the replaceably connected modules to be removed and replaced without having to remove fixed securing materials such as solder or other such materials.

Replaceable connectors can include any type of mechanical connector that allows the connector to be detached and then reattached or a replacement connector replaceably attached in its place. Suitable connector types include threaded connectors, channel locking type connectors, and/or aperture and detent connectors, among many others.

For example, a replaceable connector type can be a locking type connector where the connector is locked in place and then unlocked when the connector is to be removed. A suitable locking replaceable connector type can be mating connectors where a first connector portion mates with a second connector portion. For instance, the replaceable connection between the first module and second module can be provided by a releasable male connector and a releasable female connector being connected together.

In another example, the replaceable connection between a first module and second module can be provided by a releasable male connector and a releasable female connector being connected together and where the first module includes the female connector and the second module includes the male connector. In some such embodiments, the first module may include the male connector and the second module may include the female connector.

In various embodiments, one of the modules can be connected to multiple other modules. For example, the second module and the third module described above can be replaceably connected to the first module. In some embodiments, all of the modules can be replaceably connected together.

One of the modules (e.g., a first module) can include an illuminator for forming colors on the display. This component can be used in conjunction with a backlight of the second module, which can provide light onto the illuminator to illuminate the colors on the illuminator.

The illuminator can be any component used to form colored portions for imaging on the display. For example, the illuminator component can be a LCD glass component. Such liquid crystal components can be used to form colors such as red, green, and/or blue for use in imaging on the display. As discussed above, a back light can provide light that can be directed through the illuminator component and accordingly, the colored portions of the LCD glass can be illuminated.

In some embodiments, the display device can include a number of other modules including other types of components. The components in these modules can be grouped based upon a number of selection types. For example, the components in each module can be selected based upon life cycle, failure rate, whether or not they have to be rugged, ability to move the components to a remote location from one or more other modules, desired proximity to other components, and/or other suitable reasons for grouping certain components together into a module.

In some embodiments, for example, the display device can include a module having a number of touch panel components. The touch screen components module can be a module that can be added to a display.

In such embodiments, the module can include all of the components for changing a non-touch panel display into a touch panel display. In this manner, a display device functionality can be added by connecting one such functionality specific module to the display system.

Such functionality grouped module embodiments can be beneficial in that modules can be added or removed without substantially disturbing the other modules, in some embodiments. It also is useful in repairing a failed component having to do with a particular functionality because, since all of the components in the module have to do with a particular functionality, if the functionality is not working, it is highly likely one of the components in the module has failed.

In providing a functionality to a display device (e.g., a touch panel functionality), the component module can be electrically connected to a first module (e.g., having the illuminator and/or backlight) and may also be physically connected. In some embodiments, the display device can include multiple modules that are replaceably connected electrically and multiple modules that are replaceably connected physically. In such embodiments, one or more of the physically connected modules can also be electronically connected, as discussed above.

The modules in the embodiments of the present disclosure can each include a number of different components. For example, in various display device embodiments, the display device can include a removable module having an illuminator component, a frame component, and/or an inverter component.

In some embodiments, the display device can include a removable module having a backlight component. A removable module can also be designed having a power supply. In embodiments that have multiple such modules, any number of the modules can replaceably connected together.

In some embodiments, the module having the power supply can also include a video driver, a filter heat sink, and/or a touch panel controller, among other components that would be logically included with the power supply based upon one or more of the grouping types discussed above. As discussed, such components can be included based upon life cycle, failure rate, whether or not they have to be rugged, ability to move the components to a remote location from one or more other modules, desired proximity to other components, and/or other suitable reasons for grouping certain components together into a module.

In some embodiments, a first and second module (e.g., a module having the illuminator and a module having the backlight) can be physically and electronically connected and a third module (e.g., a module having the power supply) can be located remotely from the first and second modules and can be electronically connected to at least one of the first and second modules. This can be beneficial, in some embodiments, where the first and second modules each have to include a ruggedized component and the third module does not have a ruggedized component.

Accordingly, the first and second modules can be designed in with a rugged structure that can withstand certain environmental conditions, as discussed above, while the third module can be designed without such a focus. Additionally, in some situations, rugged components can be housed in rugged designed housing areas and, as such, with one or more modules not having to be ruggedized, it may be that the housing size or structure can be reduced. This can be beneficial, in some embodiments, because manufacturing may cost less, and/or the non-rugged components may be more accessible.

In some embodiments, the display device can include a first indicator connected to one or more of the modules to indicate that one or more of the connected modules has failed. For example, the display device may include a visual indicator to identify that a component within a module has failed. This can be accomplished, for example, by electrically connecting a light emitting diode (LED), other light source, or other indicator type, in to the circuit of the module.

In such embodiments, if the circuit of the module becomes interrupted and/or the quantity of power running through the circuit rises and/or falls past a certain threshold amount, then the light can be illuminated. In some embodiments, the indicator can be directly electrically connected to the circuit or can be arranged such that logic circuitry is interposed between the indicator and the module circuitry.

In some embodiments, a display device can have multiple indicators for multiple components. For example, a first module can have a first indicator, a second module can have a second indicator, and/or a third module can have a third indicator, and so on for the number of modules of the display system.

In some embodiments, the indicator can provide different indications for the failure of different modules, different component, and/or different types of failures of a particular component. For example, the indicator can generate a number that corresponds to the module that has failed.

In some such embodiments, if multiple modules have failed, multiple indications can be provided by the one or more indicators. For instance, this can be accomplished with different indicators for different indications, different types of indications (e.g., different patterns of blinking lights), among other mechanisms for indicating multiple indications.

The present disclosure also includes a number of method embodiments. For example, some method embodiments can include providing a display device having an inverter module with a first releasable connector and a backlight module with a second releasable connector, where the first and second releasable connectors can be connected together. In such embodiments, the first and second releasable connectors attached to a first module and a second module, respectively, and connected together to connect the first and second module together, can be disconnected and at least one of the first module (e.g., an inverter module) and second module (e.g., a backlight module) can be replaced with a replacement module having a third releasable connector (e.g., a replacement inverter or backlight module) by connecting the third releasable connector with one of the first and second releasable connectors.

In this manner, a module can be replaced with a replacement module without substantially disturbing the other modules. This can be beneficial in that the module can be removed and the display can still be utilized, if it is still functional without the module, resulting in little or no time offline.

In some instances, it may be that a replacement module can be on hand for replacement, also resulting in little or no time offline. In such instances, a module suspected of a failure can be replaced before it is tested and, therefore, even less downtime for the display device can be encountered. In many instances, this may not have been possible when the display device had to be removed to repair a component.

In some embodiments, the attachment between modules can be made such that the modules can be removed with a low level of skill by the individual removing the module. This can be accomplished in a number of ways.

For instance, a module can be connected to another module by one electrical connector. One or more of the electrical connectors connecting modules can be releasable, as described above. In such embodiments, any suitable electrical connection that can reduce the skill level and/or the tools that have to be used can be utilized.

In some embodiments, one or more of the physical connections can be of the same type, such that one tool can be used to remove one or more of the modules (e.g., screws, nuts, and/or other suitable types of fasteners). Physical connectors that can be removed without any tools (e.g., latches, locking connectors, etc.), in some embodiments. In such embodiments, any suitable physical connection type that can reduce the skill level and/or the tools that have to be used can be utilized.

DETAILED DESCRIPTION

Figure 1:
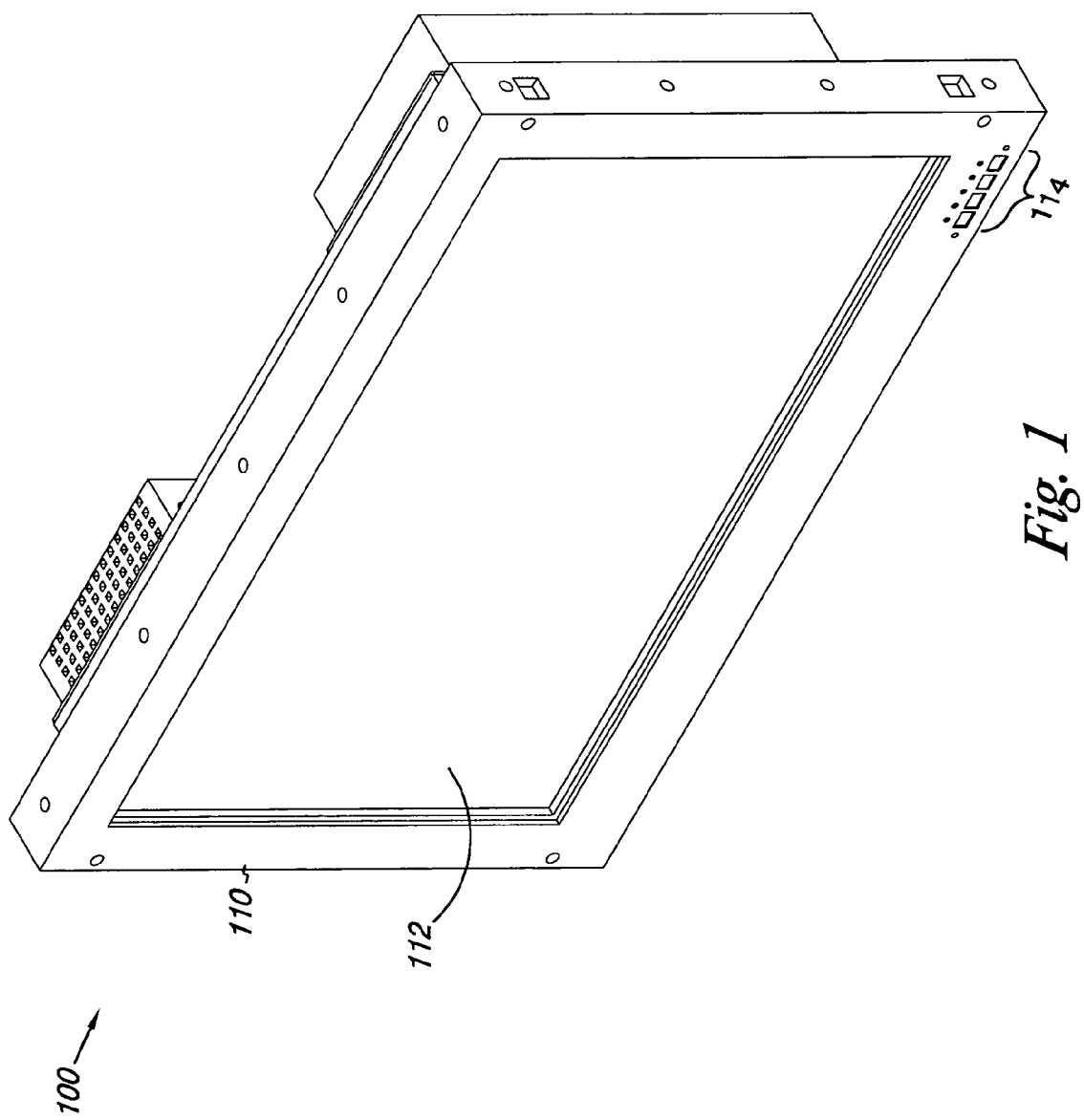
FIG. 1 is a top perspective view of a display according to an embodiment of the present disclosure.

The present disclosure includes a number of method, device, and system embodiments. Embodiments of the present disclosure will now be described in relation to the accompanying drawings, which will at least assist in illustrating various features of the various embodiments.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments. In addition, discussion of features and/or attributes for an element with respect to one figure can also apply to the element shown in one or more additional figures.

FIG. 1 is a top perspective view of a display according to an embodiment of the present disclosure. FIG. 1 illustrates a display device embodiment 100 that includes a frame 108, having a frame cover 110 and frame back 116, that houses a number of components therein. For example, the frame 108 (i.e., 110 and 116) includes an illuminator 112 (e.g., LCD glass), and a number of indicators 114.

In some embodiments, the frame 108 can be considered a module (e.g., the module housing the illuminator, among other items). Connected to the frame back 116 are a number of modules. For example, in the embodiment illustrated in FIG. 1, a module 120 (e.g., housing a number of video driver components) and a module 124 (housing a number of backlight components) are connected to the frame back 116 of the frame 108.

Each module may include circuitry to connect the various components described as being housed therein as necessary. For example, the indicators 114 are connected to one or more of the modules as described above. For instance, circuitry can be provided through the interior of the frame 108 in order to connect the indicators to the various modules.

Further, each module provides functionality to the overall display system and such circuitry to interconnect the components of the system together to provide a functional display is known in the art and is not described here in detail. However, some embodiments do utilize a reduced number of electrical connections and removable connection types and such a reduction of electrical connections and/or use of replaceable connection types are considered to be advantageous to various embodiments of the present disclosure. For example, the use of one electrical connector between modules may allow a user quick removal and/or replacement of various modules of a device or system.

Figure 2:
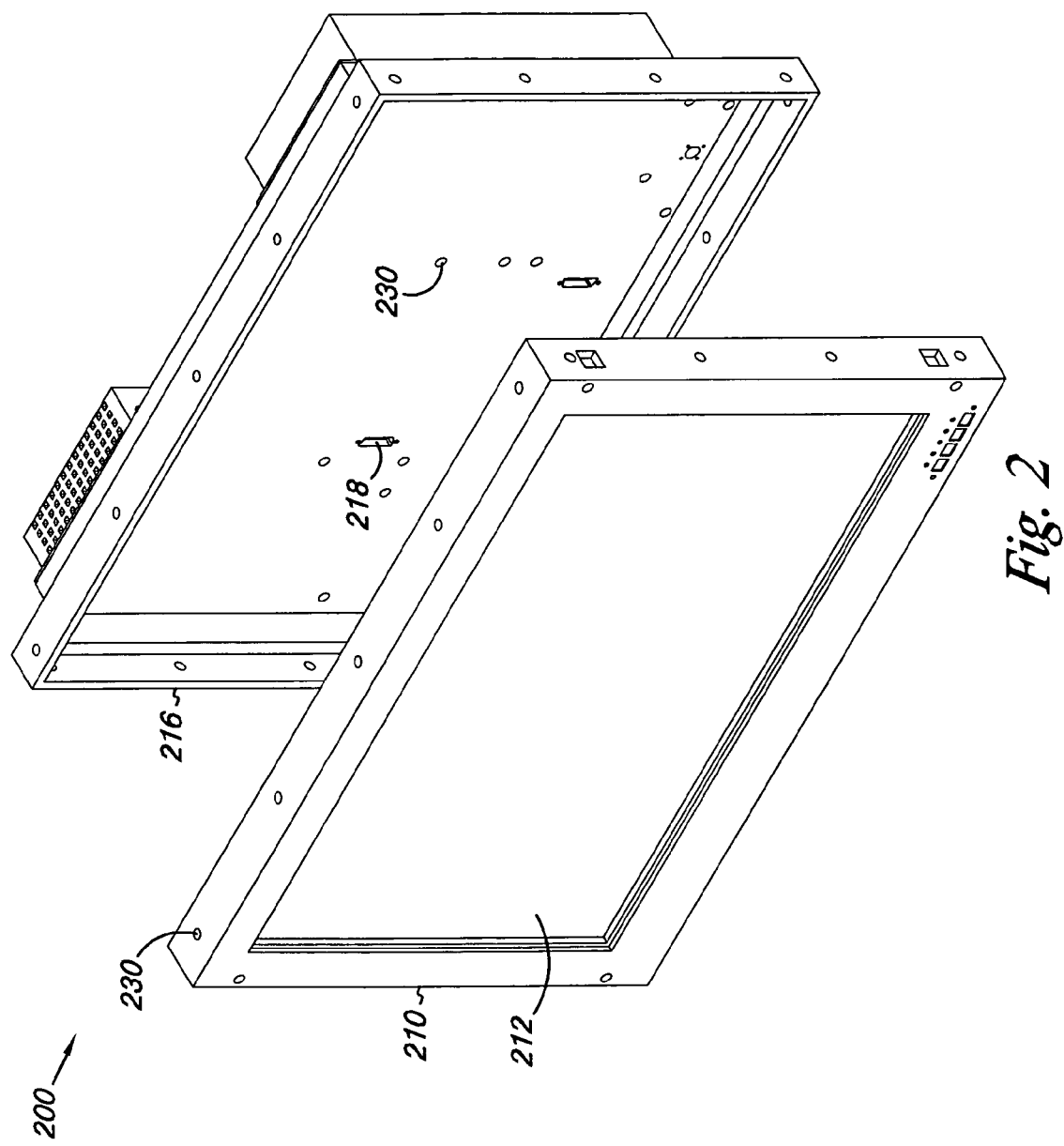
FIG. 2 is a partially exploded top perspective view of the display embodiment of FIG. 1.

FIG. 2 is a partially exploded top perspective view of the display embodiment of FIG. 1. In the view of the embodiment of FIG. 2, some components of the system have been separated to provide a better view of some aspects of the embodiment.

For example, in FIG. 2, the frame back 216 of the display device 200 has been removed from the frame cover 210. The illuminator is illustrated as being within the frame cover 210.

In such embodiments, the frame 208 can be disassembled as shown, without disconnecting the modules 220 and 224 from the frame back 216. In this manner, the components within the frame can be accessible for replacement or repair. The disassembly of the frame cover 210 from the frame back 216 of frame 208, in the embodiment illustrated in FIG. 2, can be accomplished by removing a number of physical connectors (e.g., screws) 230 and/or a number of electrical connectors 218 (e.g., connecting the illuminator with a number of touch panel controller components provided in module 328 of FIG. 3, which will be discussed in more detail below).

Figure 3:
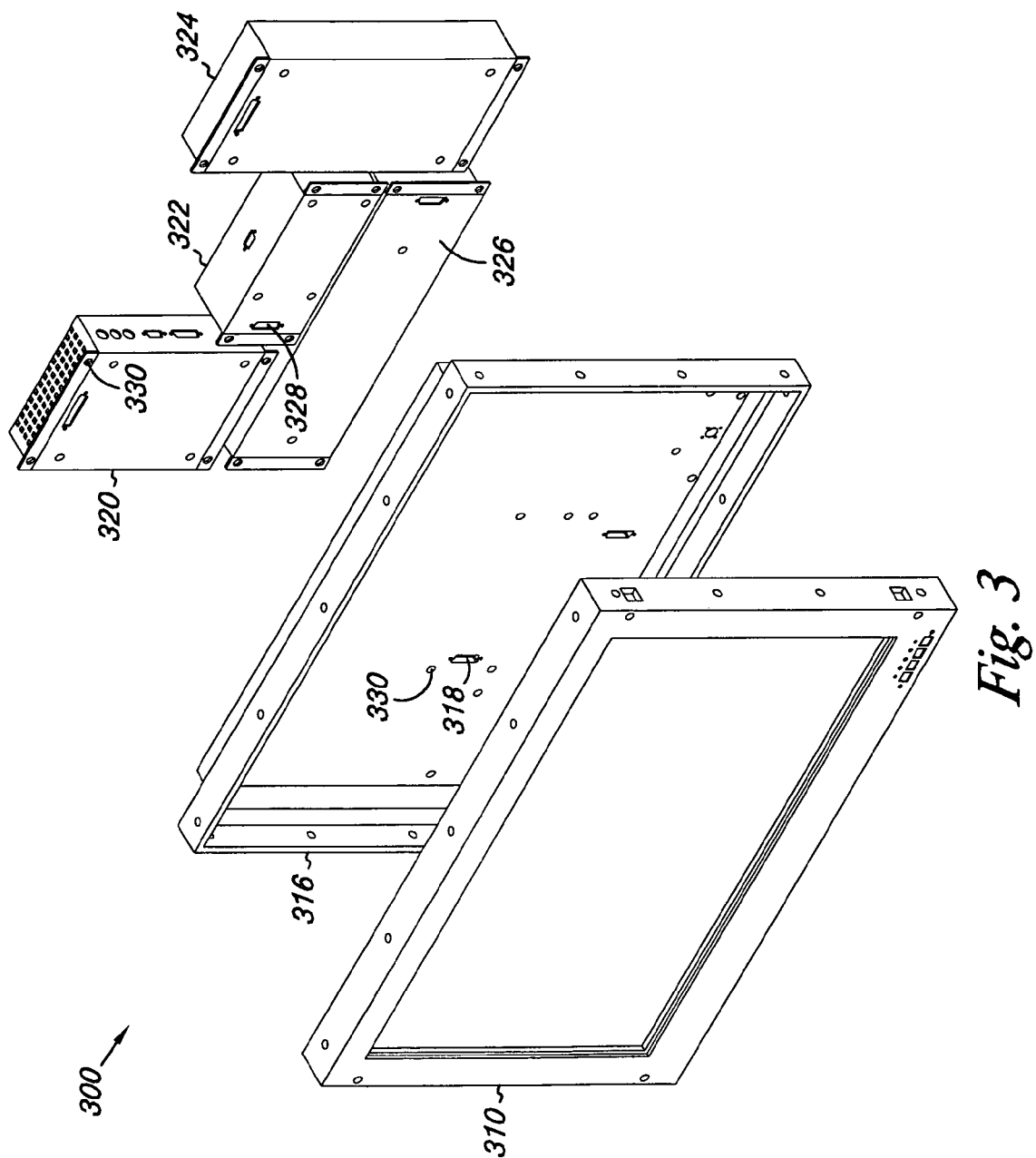
FIG. 3 is an exploded top perspective view of the display embodiment of FIG. 1.

FIG. 3 is an exploded top perspective view of the display embodiment of FIG. 1. In the view of the embodiment of FIG. 3, some more components of the system have been separated to provide a better view of some additional aspects of the embodiment.

For instance, the frame back 316 of the display device 300 is still removed from the frame cover 310 and the illuminator is illustrated as being within the frame cover 310. However, in this view, the other modules 320, 322, 324, and 326 have been removed from the frame back 316.

The disassembly of the these modules from the frame back 316 of frame 308, in the embodiment illustrated in FIG. 3, can be accomplished, for example, by removing a number of physical connectors (e.g., removing screws from holes 330) and/or a number of electrical connectors 318 (e.g., connecting the illuminator in a frame module 308 with a number of touch panel controller components provided in module 328 of FIG. 3, which will be discussed in more detail below). As discussed herein, other such electrical and physical connections of similar or other suitable types can be used to connect one or more of the modules (e.g., modules 320, 324, and/or 326) to the frame module 308.

In some embodiments, the modules 320, 322, 324, and/or 326 can be removed from frame 308 without disassembling the frame cover 310 and frame back 316. This can be beneficial, in some embodiments, because the frame 308 can substantially be undisturbed by the removal of the one or more modules attached thereto.

As discussed above, in various embodiments, one or more of the modules can be located remotely from the other modules. For example, in some embodiments, module 326 (e.g., a module including one or more power supply components) can be located remotely from modules 308, 320, 322, and/or 324.

This can be beneficial, if one or more of the components within, or one or more of the modules themselves, are to be ruggedized or are to be secured in a special manner, as discussed above. In such embodiments, one or more modules (e.g., a power supply module) can be placed remotely from one or more of the other modules (e.g., the illuminator module).

Such a remote placement of one or more modules can be beneficial, for example, in situations where there may not be a lot of room near the illuminator module or where the illuminator module is in a hard to access area (this can be the case in some rugged housings, for instance). Since a power supply module may have a high failure rate, it can be advantageous to have it in an easier to access area.

Additionally, in some rugged housings, when the housing is accessed, some of the rugged qualities may be compromised and therefore the housing has to be re-ruggedized. Having such high failure components in modules outside the rugged housing can be advantageous in such instances.

Figure 4:
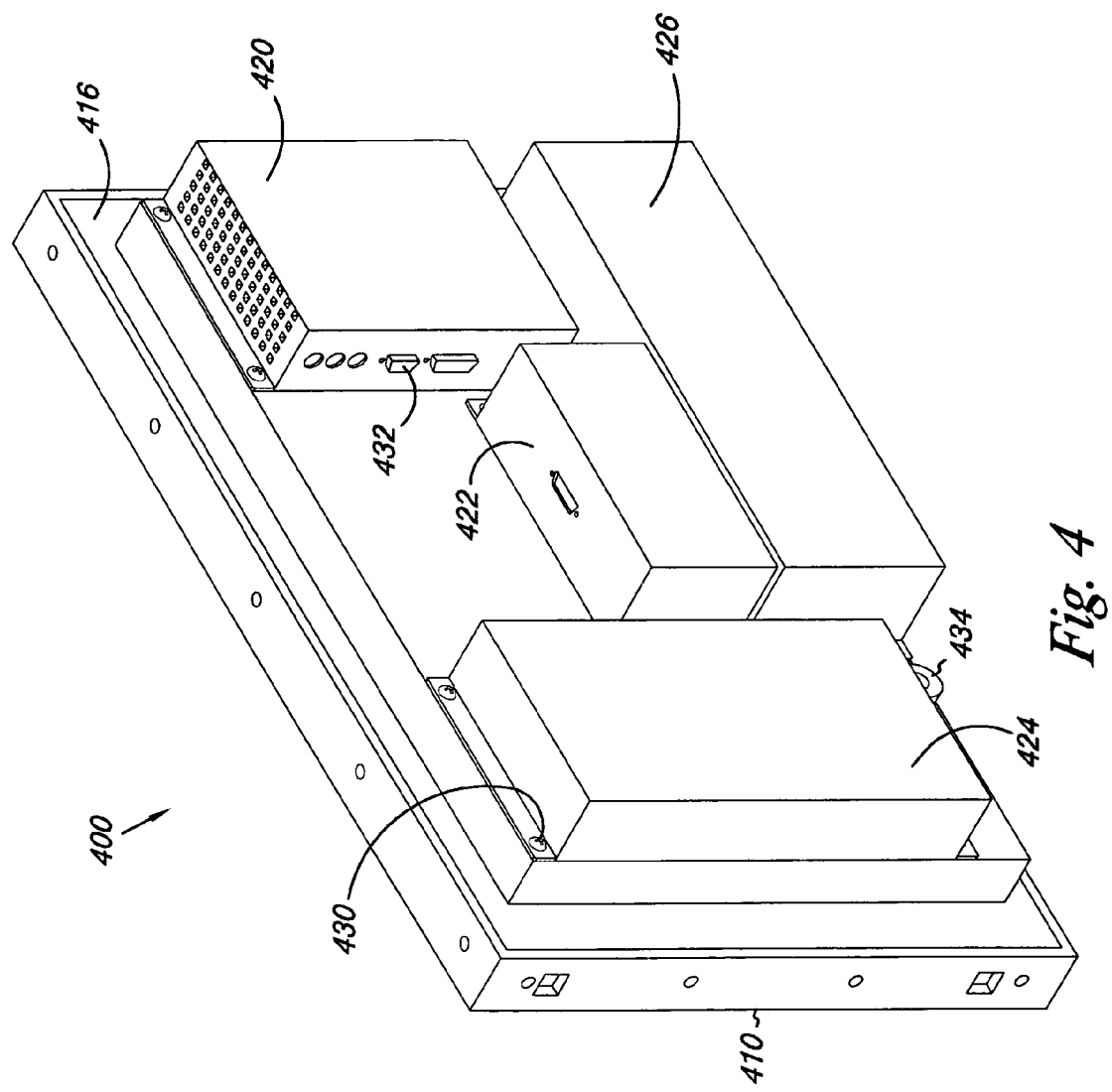
FIG. 4 is a rear angled perspective view of the display embodiment of FIG. 1.

FIG. 4 is a rear angled perspective view of the display embodiment of FIG. 1. In this view, the display device 400 is assembled and the various modules are shown connected together. For example, in this view, the modules 420, 422, 424, and 426 are connected to the frame back 416 and the frame back is connected to the frame cover 410. The view of FIG. 4 also includes a number of different types of connectors. For example, FIG. 4 includes electrical connectors 432 (e.g., a video connection) and 434 (e.g., a power connection) and a number of physical connectors 430.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A display device, comprising;
a first module including a frame having a frame cover and a frame back that houses an inverter component and a liquid crystal display glass illuminator component;
a second module having a backlight component;
a third module having a power supply; and
where the second module and the third module are replaceably connected to an exterior of the first module.

2. The display device according to claim 1, where the second module and the third module are replaceably connected together.

3. The display device according to claim 1, where the replaceable connection between the first module and second module is provided by a releasable male connector and a releasable female connector being connected together and where the first module includes the male connector and the second module includes the female connector.

4. The display device according to claim 1, where the replaceable connection between the first module and second module is provided by a releasable male connector and a releasable female connector being connected together and where the first module includes the female connector and the second module includes the male connector.

5. The display device according to claim 1, where the display device includes a fourth module having a number of touch panel components and where the fourth module is at least electrically connected to the first module.

6. The display device according to claim 1, where the replaceable connection is an electrical connection.

7. The display device according to claim 1, where the replaceable connection is a physical connection.

8. The display device according to claim 1, where the device includes at least two modules replaceably connected electrically and at least two modules replaceably connected physically.

9. The display device according to claim 1, where at least one of the second module and the third module are removable from the exterior of the first module without disassembling the frame cover and the frame back.

10. A display device, comprising:
a first removable module including a frame housing a liquid crystal display glass illuminator component and an inverter component;
a second removable module having a backlight component;
a third removable module having a power supply, where at least two of the first module, second module, and third module are replaceably connected together; and where the second module and the third module are replaceably connected to an exterior of the frame.

11. The display device according to claim 10, where the third module includes a video driver.

12. The display device according to claim 10, where the third module includes a filter heat sink.

13. The display device according to claim 10, where the third module includes a touch panel controller.

14. The display device according to claim 13, where the first and second modules are physically and electronically connected and where the third module is located remotely from the first and second modules and is electronically connected to at least one of the first and second modules.

15. The display device according to claim 14, where the first and second modules each have at least one ruggedized component and where the third module does not have a ruggedized component.

16. The display device according to claim 10, where the display device includes a first indicator connected to at least one of the modules to indicate that at least one of the connected modules has failed.

17. The display device according to claim 16, where the display device includes a first indicator connected to the first module to indicate that the first module has failed.

18. A display system, comprising;
a first module including a frame having a frame cover and a frame back that houses an inverter component and a liquid crystal display glass illuminator component;
a second module replaceably connected to an exterior of the frame and having a backlight component a third module replaceably connected to the exterior of the frame and having a power supply module and where at least two of the first module, second module, and third module are connected together; and
a first indicator electrically connected to at least one of the first and second modules to indicate that that the connected module has failed.

19. The system according to claim 18, where the first indicator is electrically connected to the first module to indicate that that the first module has failed and where the system includes a second indicator that is electrically connected to the second module to indicate that that the second module has failed.

20. The system according to claim 18, where the system includes a third indicator electrically connected to the third module to indicate that the third module has failed.

21. The system according to claim 19, where the system includes a third indicator electrically connected to the third module to indicate that the third module has failed.

22. The system according to claim 21, where the system includes a fourth indicator electrically connected to a fourth module to indicate that the fourth module has failed and where the fourth module includes a touch screen component.

23. A method, comprising:

providing a display device including:

an inverter module having a first releasable connector and housed within a frame having frame cover a frame back an illuminator component being a liquid crystal display glass component housed within the frame; and a backlight module replaceably connected to and exterior of the frame and having a second releasable connector, where the first and second releasable connectors are connected together and a power supply module replaceably connected to the exterior of the frame;

disconnecting the first and second releasable connectors, and replacing at least one of the inverter module and backlight module with a replacement module having a third releasable connector by connecting the third releasable connector with one of the first and second releasable connectors.

24. The method of claim 23, where replacing at least one of the inverter module and backlight module includes replacing the inverter module with a replacement inverter module having a third releasable connector by connecting the third releasable connector with the second releasable connector.

25. The method of claim 23, where replacing at least one of the inverter module and backlight module includes replacing the backlight module with a replacement backlight module having a third releasable connector by connecting the third releasable connector with the first releasable connector.

* * * * *